I. Dunham,
Riding Saddle.

Nº 36,900.  Patented Nov. 11, 1862.

Witnesses
J. W. Coombs
G. W. Reed

Inventor
Ira Dunham
per Munn & Co
Attorneys

UNITED STATES PATENT OFFICE.

IRA DUNHAM, OF PLATTSBURG, MISSOURI.

IMPROVEMENT IN SADDLES.

Specification forming part of Letters Patent No. 36,900, dated November 11, 1862.

*To all whom it may concern:*

Be it known that I, IRA DUNHAM, of Plattsburg, in the county of Clinton and State of Missouri, have invented a new and Improved Riding-Saddle; and I do hereby declare that the following is a full, clear, and exact description of the same, reference being had to the accompanying drawings, forming a part of this specification, in which—

Figure 1:
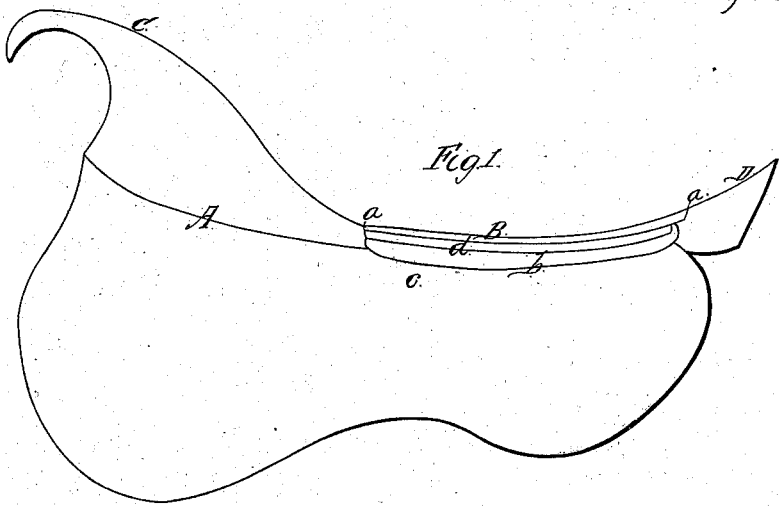
Figure 2:
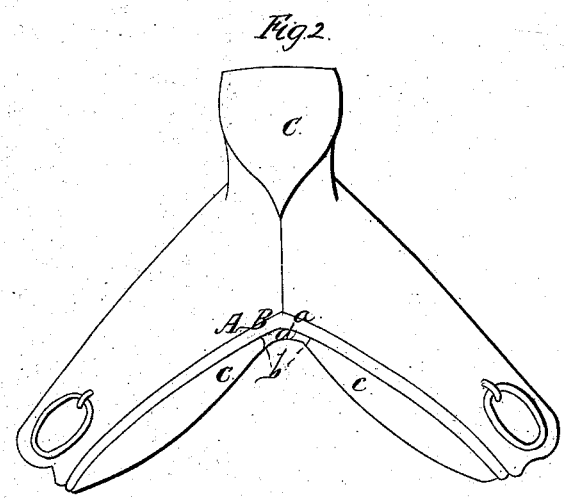

Figure 1 represents a longitudinal vertical section of my invention. Fig. 2 is a transverse vertical section of the same.

Similar letters of reference in both views indicate corresponding parts.

To enable those skilled in the art to make and use my invention, I will proceed to describe it with reference to the drawings.

The tree A of my saddle is made heavier fore and aft than ordinary trees, so as to afford room for a recess, $a$, which is intended to receive the seat B. This seat is made of india-rubber or other elastic and otherwise suitable material molded and shaped so that it fits closely into the recess $a$.

The opening $b$ between the pommel C and the cantle D of my saddle is shorter by five or six inches than the corresponding opening in an ordinary saddle-tree of the same size, and the sides or bars $c$ of my tree come closer together than the bars of an ordinary saddle-tree, so that the seat has no chance to sag down, and, furthermore, the tree is rendered stronger and more durable than a saddle-tree of the ordinary construction.

By the use of the india-rubber seat B, fitting in the recess $a$, the usual groundwork of the seat, such as webbing, cross-straining, and the stuffing, can be dispensed with altogether, and, furthermore, my seat is not liable to become hard by the compression of the rider, or, when used up, it can very easily be removed and replaced by a new piece.

In order to strengthen the seat B and to keep it securely in place, it is provided with a projection, $d$, at its lower surface, which fits into the opening or slot $b$, as clearly shown in Fig. 2 of the drawings. If the external covering of the saddle is put on, the elastic seat B is securely held in place, and it is prevented working on one side or being displaced by the motions of the horse or rider.

By these improvements a saddle can be produced which is stronger and more durable than a saddle of the ordinary construction, and which surpasses the ordinary saddle in cheapness and convenience for horse and rider.

Having thus fully described my invention, what I claim as new, and desire to secure by Letters Patent, is—

The employment or use of an india-rubber seat, B, provided with a downward projection, $d$, in combination with a saddle-tree, A, which is furnished with a recess, $a$, to receive the projection $d$, substantially as and for the purpose shown and described.

IRA DUNHAM.

Witnesses:
THO. E. TURNER,
CH. W. PORTER.